United States Patent
Mailhe et al.

(10) Patent No.: US 12,505,913 B2
(45) Date of Patent: Dec. 23, 2025

(54) ARTIFICIAL INTELLIGENCE FOR END-TO-END ANALYTICS IN MAGNETIC RESONANCE SCANNING

(71) Applicant: Siemens Healthineers AG, Forchheim (DE)

(72) Inventors: Boris Mailhe, Plainsboro, NJ (US); Dorin Comaniciu, Princeton, NJ (US); Ali Kamen, Skillman, NJ (US); Bin Lou, Princeton, NJ (US); Mariappan S. Nadar, Plainsboro, NJ (US); Andreas Greiser, Erlangen (DE); Venkata Veerendranadh Chebrolu, Rochester, MN (US)

(73) Assignee: Siemens Healthineers AG, Forchheim (DE)

( * ) Notice: Subject to any disclaimer, the term of this patent is extended or adjusted under 35 U.S.C. 154(b) by 412 days.

(21) Appl. No.: 17/804,625

(22) Filed: May 31, 2022

(65) Prior Publication Data
US 2023/0253095 A1    Aug. 10, 2023

Related U.S. Application Data

(60) Provisional application No. 63/267,789, filed on Feb. 10, 2022.

(51) Int. Cl.
*G16H 30/20* (2018.01)
*G01R 33/56* (2006.01)

(52) U.S. Cl.
CPC ......... *G16H 30/20* (2018.01); *G01R 33/5608* (2013.01)

(58) Field of Classification Search
CPC ........ G16H 30/20; G16H 50/20; G16H 50/30; G16H 50/70; G16H 40/20; G16H 20/00; G01R 33/5608
See application file for complete search history.

(56) References Cited

U.S. PATENT DOCUMENTS

| | | | | |
|---|---|---|---|---|
| 5,760,582 A | * | 6/1998 | Morrone | G01R 33/3875 324/318 |
| 6,129,668 A | * | 10/2000 | Haynor | A61B 5/062 600/408 |
| 6,631,204 B1 | * | 10/2003 | Smith | G06V 10/42 382/130 |

(Continued)

OTHER PUBLICATIONS

Qi, Yifan et al; "Deep-learning cardiac MRI for quantitative assessment of ventricular volumes"; Proceedings of the 2021 ISMRM & SMRT annual meeting & exhibition; published: Apr. 30, 2021; XP040724890.

(Continued)

*Primary Examiner* — Oommen Jacob

(57) ABSTRACT

For data analytics in magnetic resonance (MR) scanning, the scanning configuration information and the resulting raw data are directly used to determine the analytics or clinical decision. Artificial intelligence provides a value for a clinical finding characteristic of the patient based on the raw data from scanning and the controls used to scan, allowing the value to be based on all of the information content of the scan results. Reconstruction is not needed, allowing for simpler hardware, such as hardware with less homogeneous B0 and/or B1 fields than the norm and/or non-linear gradients.

13 Claims, 2 Drawing Sheets

(56) References Cited

U.S. PATENT DOCUMENTS

| | | | | |
|---|---|---|---|---|
| 6,841,998 | B1* | 1/2005 | Griswold | G01R 33/5611 |
| | | | | 324/309 |
| 11,120,585 | B2* | 9/2021 | Chen | G06N 3/045 |
| 11,276,483 | B2* | 3/2022 | De Brouwer | G16H 15/00 |
| 11,791,048 | B2* | 10/2023 | Pang | G16H 50/70 |
| | | | | 705/2 |
| 2013/0023741 | A1* | 1/2013 | Ayanruoh | A61B 5/01 |
| | | | | 600/300 |
| 2015/0276909 | A1* | 10/2015 | Kawaji | A61B 5/024 |
| | | | | 600/416 |
| 2016/0210298 | A1* | 7/2016 | Thompson, III | G06F 16/9024 |
| 2019/0298288 | A1* | 10/2019 | Huber | A61B 6/482 |
| 2020/0026967 | A1* | 1/2020 | Kartoun | G01R 33/4818 |
| 2020/0400769 | A1* | 12/2020 | Arroyo Camejo | |
| | | | | G01R 33/56509 |
| 2021/0018584 | A1* | 1/2021 | Golay | G01R 33/5608 |
| 2021/0150783 | A1* | 5/2021 | Arberet | G06N 3/045 |
| 2021/0174937 | A1* | 6/2021 | Swisher | G06T 11/003 |
| 2021/0265043 | A1* | 8/2021 | Haghighi | G16H 50/20 |
| 2021/0343014 | A1* | 11/2021 | Haghighi | G06V 10/82 |
| 2022/0067533 | A1* | 3/2022 | Jiao | G06N 3/063 |
| 2022/0092771 | A1* | 3/2022 | Itu | G06T 7/0012 |
| 2022/0293272 | A1* | 9/2022 | Pang | G16H 20/00 |
| 2023/0253095 | A1* | 8/2023 | Mailhe | G16H 30/20 |
| | | | | 705/2 |
| 2024/0185396 | A1* | 6/2024 | Hatamizadeh | G06T 5/60 |
| 2024/0257366 | A1* | 8/2024 | Dey | G06T 7/337 |
| 2025/0060782 | A1* | 2/2025 | Mahmud | G06F 18/24 |
| 2025/0095229 | A1* | 3/2025 | Wang | H04N 13/279 |

OTHER PUBLICATIONS

Xiao, Linfang et al; "Deep Learning Pathology Detection from Extremely Sparse K-Space Data"; Proceedings of the 2021 ISMRM & SMRT annual meeting & exhibition; published: Apr. 30, 2021; XP040724429.

Liu, Yilin et al; "Real-Time Mapping of Tissue Properties for Magnetic Resonance Fingerprinting"; 16th european conference—computer vision—ECCV 2020, Cornell university ithaca; published: Sep. 21, 2021; pp. 161-170; XP047611038.

Extended European Search Report for Corresponding EP Application No. 23156027.7.

Vaswani, Ashish, et al. "Attention is all you need." Advances in neural information processing systems 30 (2017). pp. 1-11.

Huang, Qiaoying, et al. "Brain segmentation from k-space with end-to-end recurrent attention network." International Conference on Medical Image Computing and Computer-Assisted Intervention. Springer, Cham, 2019. pp. 1-13.

Schlemper, Jo, et al. "Cardiac MR segmentation from undersampled k-space using deep latent representation learning." International Conference on Medical Image Computing and Computer-Assisted Intervention. Springer, Cham, 2018. Chapter 6. pp. 118-127.

Raghav Singhal et al. "Learning to Accelerate MR for Population-Level Screening" 35th Conference on Neural Information Processing Systems (NeurIPS 2021), Sydney, Australia. pp. 1-6.

* cited by examiner

ARTIFICIAL INTELLIGENCE FOR END-TO-END ANALYTICS IN MAGNETIC RESONANCE SCANNING

RELATED APPLICATIONS

The present patent document claims the benefit of the filing date under 35 U.S.C. § 119(e) of Provisional U.S. Patent Application Ser. No. 63/267,789, filed Feb. 10, 2022, which is hereby incorporated by reference.

BACKGROUND

Magnetic resonance (MR) imaging devices are currently built to fit a manual workflow where the scanner first reconstructs images, and then those images are shown to a radiologist for reading. This comes with multiple shortcomings. First, since reconstruction is a deterministic function of the acquired data, reconstruction suppresses information. While some of that suppression may be beneficial (e.g., in presence of noise), the criteria to decide what to keep and what to suppress are subjective and only loosely linked to the clinical decision being answered. Second, a lot of the current MR imaging inner workings are designed to simplify the reconstruction task rather than to optimize the information rate of the scan. For example, the use of Cartesian sampling to enable fast Fourier transform (FFT) reconstruction, PAT sampling to enable GRAPPA, and fully sampled multi-contrast protocols for independent reconstruction help with reconstruction while loosing information. Finally, those simplifying assumptions also put high requirements on the MR hardware. K-space sampling requires linear gradients, and spatially constant image contrast requires homogeneous B0 and B1 fields. These hardware requirements result in more costly MR imaging devices.

SUMMARY

By way of introduction, the preferred embodiments described below include methods, systems, instructions, and non-transitory computer readable media for data analytics for MR scanning. The scanning configuration information and the resulting raw data are directly used to determine the analytics or clinical decision. Artificial intelligence provides a value for a clinical finding characteristic of the patient based on the raw data from scanning and the controls used to scan, allowing the value to be based on all of the information content of the scan results. Reconstruction is not needed, allowing for simpler hardware, such as hardware with less homogeneous B0 and/or B1 fields than the norm and/or non-linear gradients.

In a first aspect, a method of data analytics is provided for MR scanning. A patient is MR scanned using a first configuration of an MR scanner, resulting in raw data. A value for an analytic of the patient is generated in response to input of information of the first configuration and the raw data to a machine-learned model. The value is generated without image reconstruction. The value for the analytic is displayed.

In one embodiment, the MR scanning is with a non-uniform main magnetic field, non-homogeneous first pulses, and non-linear gradients. More basic and/or cheaper hardware may be used.

Various information representing the configuration may be input to the machine-learned model to generate the value of the analytic. In one approach, the information of the first configuration is transmit pulses. The value is generated in response to input of the transmit pulses to the machine-learned model. In another approach, the information is k-space coordinates, repetition time, time-to-echo, and flip angle. The value is generated in response to input of the k-space coordinates, repetition time, time-to-echo, and flip angle to the machine-learned model. In yet another approach, the information is pulse envelopes, carrier frequencies, timings, and durations. The value is generated in response to input of the pulse envelopes, carrier frequencies, timings, and durations to the machine-learned model. In all three approaches, if multiple RF coils are used to transmit the pulses, then the information of all the coils can be concatenated and used as inputs to the machine-learned model.

In another embodiment, such as where the information is from the transmit pulses, the information is formed as a latent space representation of the first configuration. The information is formed as an output of an encoder in response to input of the first configuration (i.e., transmit pulses) to the encoder. The value is generated in response to the input of the latent space representation.

As another embodiment, the first configuration includes first pulses and a plurality of receive coils. A plurality of tokens is defined where each of the tokens is the raw data for the receive coils from one of the first pulses and the information. The different tokens are for the different ones of the first pulses. The plurality of tokens is input to the machine-learned model.

Various machine-learned models may be used. In one approach, the machine-learned model is a neural network. In another approach, the machine-learned model is a sequence of transformers comprising attention layers. The information is used as position encoding within the sequence.

The machine-learned model may have been pre-trained. For example, the machine-learned model was pretrained by continual distributed learning in other scanners.

In another embodiment, the machine-learned model was trained using synthetic data.

Various analytics may be used. For example, the value is cancer or not. As another example, the value is no further scanning or further scanning as the analytic.

In one embodiment, the value is generated from the raw data without image reconstruction as an input to the machine-learned model and without performance of the image reconstruction by or within the machine-learned model.

In a second aspect, a method of data analytics is provided for MR scanning. A patient is MR scanned using a first configuration of an MR scanner and resulting in raw data. A value for a parameter is generated as a global characterization of the patient in response to input of information of the first configuration and the raw data to a machine-learned model. the value for the parameter is displayed.

In one embodiment, the value is generated without reconstruction from the raw data. In another embodiment, the machine-learned model is a neural network of transformer layers. A first of the transformer layers receives as input tokens, each of the tokens being the raw measurements from different pulses of the MR scanning and each of the tokens including the information as a descriptor of settings of the MR scanner. In yet another embodiment, the machine-learned model was pre-trained with self-supervision at a plurality of other scanners.

In a third aspect, a system is provided for MR scanning. A MR scanner is configured by settings of controls to scan a region of a patient, the scan providing raw data. An image processor is configured to determine a global analytic for the patient by application of a machine-learned network to the raw data without reconstruction from the raw data. A display is configured to output the global analytic.

In one embodiment, the machine-learned network is a neural network of a sequence of attention layers where an input of the neural network receives tokens. Each token is the raw data from all receive coils in combination with information about the settings of the controls.

The present invention is defined by the following claims, and nothing in this section should be taken as a limitation on those claims. Further aspects and advantages of the invention are discussed below in conjunction with the preferred embodiments and may be later claimed independently or in combination.

DETAILED DESCRIPTION

The data acquired by an MR scanner is leveraged by enabling end-to-end data artificial intelligence (AI) analytics from raw signals to clinical findings. This end-to-end approach both improves and standardizes performance. Being able to directly analyze the acquired data allows relaxation of hardware requirements and/or may enable shorter protocols. Relaxing hardware constraints reduces costs by reduction in design requirements, allowing more accessible MR devices. Devices with relaxed design may not provide images or useful images but may provide analytics as a new way to understand the captured measurements. While the image reconstruction is necessary in the current workflow because it prepares the data for human consumption, reconstruction is an unnecessary bottleneck in an AI analytics workflow where the images produced by the reconstruction algorithm are then passed to another analytics algorithm.

The image reconstruction step is skipped. Fully automated, low-cost MR devices may be provided where image reconstruction is not the goal. The MR devices are not built to produce images in the first place. Removing the need to easily reconstruct images may also enable faster protocols on high-field (i.e., image quality) scanners.

For training the AI, online self-supervised pre-training at scanners allows leveraging of an installed base. More data may be available in this way.

Figure 1:
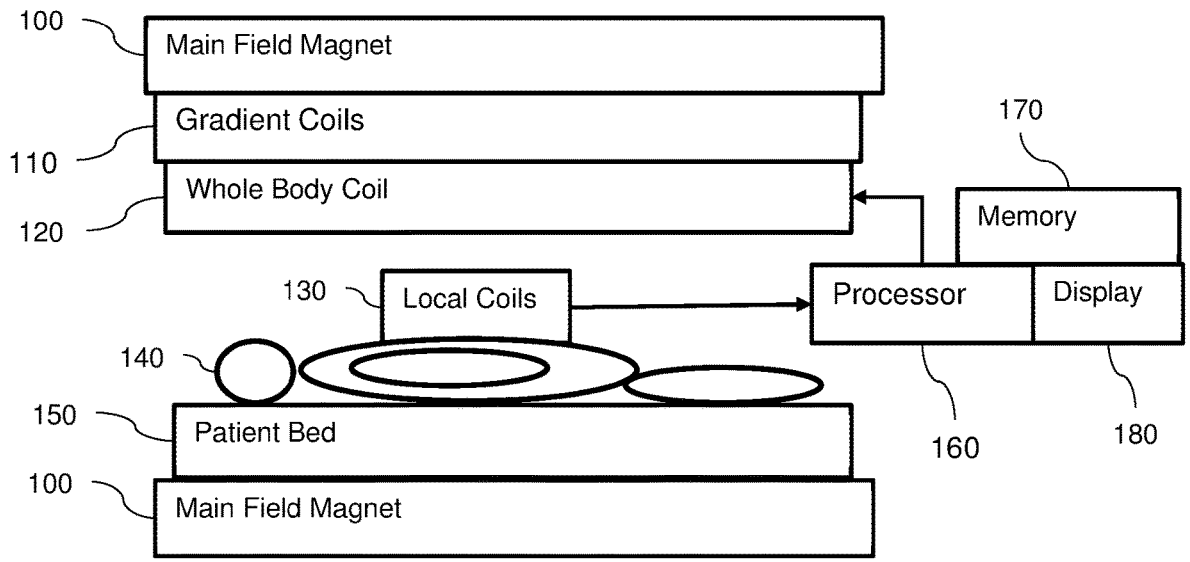
FIG. 1 is a block diagram of an embodiment of an MR system for medical imaging.

FIG. 1 shows one embodiment of a system for MR scanning by an MR scanner. The MR scanner scans a given patient 140. The MR scanner is used to directly determine a value for an analytic without reconstruction of an image. The MR scanner may have reduced requirements, such as non-homogenous fields and/or non-linear gradients. The MR scanner may be capable of image reconstruction but may use more rapid or different scanning for direct determination of the analytic from raw scan data.

Figure 2:
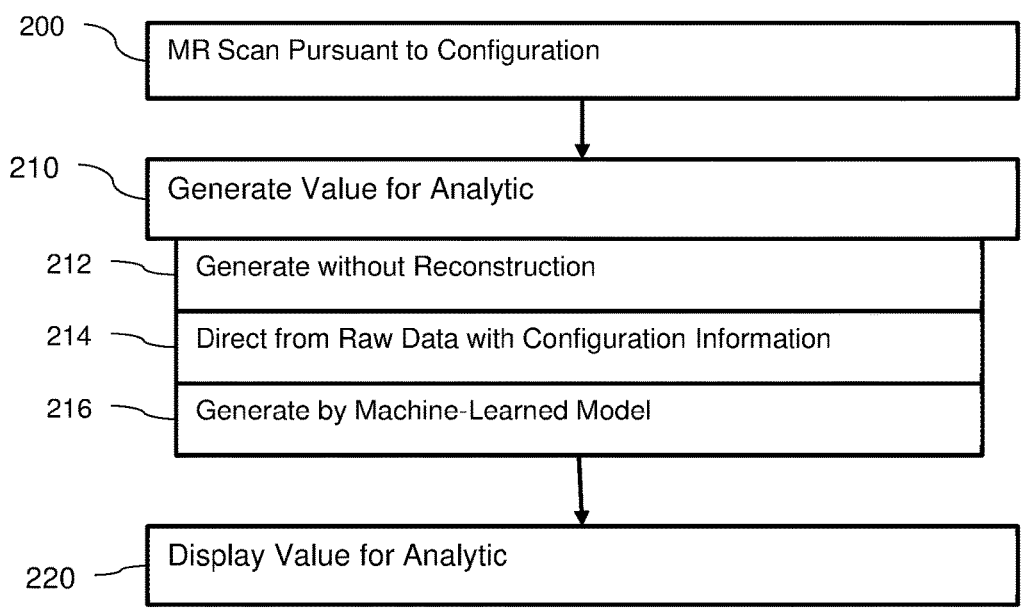
FIG. 2 is a flow chart diagram of one embodiment of a method for MR scanning.

The MR scanner performs the acts of FIG. 2 or another method. The MR scanner includes a main field magnet 100, gradient coils 110, whole body coil 120, local coils 130, and a patient bed 150. The system includes the MR scanner, processor 160, memory 170, and display 180. Additional, different, or fewer components may be provided for the MR scanner and/or system. For example, the local coils 130 or the whole-body coil 120 are not used. In another example, the processor 160, memory 170, and display 180 are provided without the coils 100-120 and bed 150, such as a workstation operating on scan data stored in the memory 170. In yet another example, the processor 160, memory 170, and/or display 180 are part of the MR scanner.

The MR scanner is configured by settings of controls to scan a region of the patient 140. The scan provides scan data in a scan domain. The MR scanner scans the patient 140 to provide raw measurements (measurements in a possibly non-linear frequency domain). Since hardware imperfections make the spatial encoding non-Fourier, the measured responses are referred to as raw data rather than k-space data. For the scan, the main field magnet 100 creates a static base magnetic field, B0, in the body of patient 140 positioned on the bed 150. The gradient coils 110 produce position dependent magnetic field gradients superimposed on the static magnetic field. The gradient coils 110 produce position dependent and shimmed magnetic field gradients in three orthogonal directions and generate magnetic field pulse sequences. The whole-body coil 120 and/or the local coils 130 receive radio frequency (RF) transmit pulses, producing magnetic field pulses (B1) that rotate the spins of the protons in the imaged region of the patient 140.

In response to applied RF pulse signals, the whole-body coil 120 and/or local coils 130 receive MR signals, i.e., signals from the excited protons within the body as they return to an equilibrium position established by the static and gradient magnetic fields. The MR signals are detected and processed by a detector, providing an MR dataset of raw data. A raw storage array of the memory 170 stores corresponding individual measurements forming the MR dataset.

The MR scanner is configured by the processor 160 to scan. Any of various scanner controls may be set, such as k-space coordinates, TR, TE, flip angle, pulse envelopes, carrier frequencies, timings, durations, and/or raw transmit pulses. A protocol, with or without user input or alteration, may establish the settings used for a particular scan. Any level of generality may be provided for the settings, such as an abstraction of the actual variables used for specific hardware. The memory 170 stores the configuration (e.g., a predetermined pulse sequence of an imaging protocol and a magnetic field gradient and strength data as well as data indicating timing, orientation, and spatial volume of gradient magnetic fields to be applied in scanning) and the resulting raw data or measurements.

The processor 160 configures the MR scanner and/or determines a value for one or more analytics from raw data. The processor 160 is a general processor, digital signal processor, graphics processing unit, application specific integrated circuit, field programmable gate array, artificial intelligence processor, tensor processor, digital circuit, analog circuit, combinations thereof, or another now known or later developed device for operating on raw data and/or applying artificial intelligence. The processor 160 is a single device, a plurality of devices, or a network. For more than one device, parallel or sequential division of processing may be used. Different devices making up the image processor may perform different functions, such as configuring the MR scanner to scan by one device and determining an analytic based on raw data by another device. In one embodiment, the processor 160 is a control processor or other processor of the MR scanner. Other processors of the MR scanner or external to the MR scanner may be used.

The processor 160 is configured by software, firmware, and/or hardware to perform its task. The processor 160 operates pursuant to instructions stored on a non-transitory medium (e.g., memory 170) to perform various acts described herein.

The processor 160 is configured to determine an analytic for the patient. The analytics may be a global analytic, such as a representing a characteristic of the patient in general rather than by location-by-location as in imaging. For example, the global analytic is a clinical finding, such as (1) no or possible cancer or (2) no need or need for further scanning or imaging.

The processor 160 is configured to determine a value for the analytic by application of a machine-learned network or other machine-learned model to the raw data without reconstruction from the raw data. The image reconstruction step is skipped or not provided. AI analytics are performed directly from the raw data to clinical findings. The processor uses a machine-learned model to determine the analytic without reconstruction. The machine-learned model is formed from one or more networks and/or another machine-learned architecture (e.g., support vector machine). For example, and used herein, the machine-learned network is a deep-learned neural network. In another example, the machine-learned network is a neural network of a sequence of transformer and/or attention layers. An input of the neural network receives tokens or other input data arrangement. Each token is the raw data from one or more coils in combination with information about the settings of the controls for a given transmit pulse.

The memory 170 is a cache, buffer, RAM, removable media, hard drive, or another computer readable storage medium. Computer readable storage media include various types of volatile and nonvolatile storage media.

The memory 170 stores raw data, the settings for the controls, information derived from the settings, the machine-learned network, and/or values for analytics. The memory 170 may alternatively or additionally store instructions for the processor 160. The functions, acts or tasks illustrated in the figures or described herein are executed by the processor 160 in response to one or more sets of instructions stored in or on the non-transitory computer readable storage media of the memory 170. The functions, acts or tasks are independent of the particular type of instructions set, storage media, processor or processing strategy and may be performed by software, hardware, integrated circuits, firmware, micro code and the like, operating alone or in combination.

In one embodiment, the instructions are stored on a removable media device for reading by local or remote systems. In other embodiments, the instructions are stored in a remote location for transfer through a computer network. In yet other embodiments, the instructions are stored within a given computer, CPU, GPU or system. Because some of the constituent system components and method steps depicted in the accompanying figures may be implemented in software, the actual connections between the system components (or the process steps) may differ depending upon the manner in which the present embodiments are programmed.

The display 180 is a CRT, LCD, plasma, projector, printer, or other display device. The display 180 is configured by loading an image to a display plane or buffer. The display 180 is configured to display the analytic, such as a value for each of one or more global analytics (e.g., clinical findings). The display may be of the value with or without a reconstructed image of the patient 140. For example, the display is part of a report, text result, or electronic health record for the patient. The display by the display 180 outputs the value for the analytic to assist the medical professional with decision making. For example, the value is that there is possible cancer of the prostate detected and/or that further scanning or imaging should be performed. Where the MR scanner is a lost cost scanner with no or poor imaging capability, the scan may be used as a first test with cheaper equipment to determine whether more costly MR or other type of medical imaging should be performed.

FIG. 2 is a flow chart diagram of one embodiment of a method of data analytics for MR scanning. A machine-learned model as trained is applied to generate a value for each of one or more analytics from raw data. The value is generated without reconstruction and/or by inclusion of information about scan configuration as input with the raw data.

During application of the machine-learned model to one or more different patients and corresponding different scan data, the same learned weights or values are used. The model and values for the learnable parameters are not changed from one patient to the next, at least over a given time (e.g., weeks, months, or years) or given number of uses (e.g., tens or hundreds). These fixed values and corresponding fixed model are applied sequentially and/or by different processors to scan data for different patients. The model may be updated, such as retrained, or replaced but does not learn new values as part of application for a given patient.

The method is performed by the system of FIG. 1 or another system. The MR scanner scans the patient. A processor determines the value of the analytic by input of the raw data to the machine-learned model. A display displays the value for the analytic. Other components may be used, such as a remote server or a workstation performing the generation and/or display.

The method is performed in the order shown (top to bottom or numerical) or other orders. Additional, different, or fewer acts may be provided. For example, a preset, default, or user input settings are used to configure the scanning prior to act 200. As another example, the value is stored in a memory (e.g., computerized patient medical record) or transmitted over a computer network instead of or in addition to the display of act 220. In yet another example, any one, two, or all of acts 212, 214, and/or 216 are not performed.

In act 200, the MR scanner scans the patient using a configuration of the MR scanner. The scan is guided by a protocol, which establishes values for settings or control of the scanning. The scanning results in measurements. A pulse sequence (i.e., plurality of pulses from one or more coils) is created based on the configuration of the MR scanner (e.g., the imaging protocol selected). The pulse sequence is transmitted from coils into the patient. The resulting responses are measured by receiving radio frequency signals at the same or different coils. The scanning results in raw measurements as the scan data.

The MR scanner may be an image caliber MR scanner, such as having a homogenous B0 field provided by 0.5 T or higher field strength, having homogenous B0 field An imaging caliber B0 field has, for example, <0.5 ppm VRMS over the volume of interest), and imaging caliber linear gradients have, for example, <2% geometric distortion). In other embodiments, the MR scanner has less restrictive design constraints, such as being designed and built for analytics without reconstruction or use for imaging. For example, the scan includes a non-uniform main magnetic field (e.g., 10% variation in scan region of patient), non-homogeneous B0 field or transmit pulses (e.g., >0.5 ppm), and/or non-linear gradients (e.g., >2% geometric distortion).

In act 210, a processor (e.g., computer, workstation, server, or scanner processor) generates a value for each of one or more analytics of the patient. The analytic is a parameter representing the patient. The parameter is not imaging or representation pixel-by-pixel or voxel-by-voxel, but instead represents more generalized information, such as a clinical finding. The analytic or parameter is a global characterization. While characterizing an organ, anatomy, and/or lesion, the characterization is general to the region rather than being for specific parts of the region. For example, the analytic is whether the patient has an indication of cancer or not. As another example, the analytic is whether a tumor is benign or malignant. In yet another example, the analytic is a cancer stage. One of the stages may be no cancer. As another example, the analytic is whether further scanning is recommended or not. The further scanning may be in the sense of further testing, whether by image scanning or by laboratory screening. Probabilistic or non-binary values may be generated, such as likelihood of cancer or not or another clinical finding.

Acts 212, 214, and 216 represent one example of acts performed to generate the value in act 210. Additional, different, or fewer acts may be provided to generate the value.

In act 212, the processor generates the value without image reconstruction. Raw data, such as measured data or data derived from the measured data, is used to generate. An image (e.g., pixels) and/or volume (e.g., voxels) spatially representing a distribution of response from within the patient is not reconstructed. Even if reconstructed, the reconstructed information representing spatial distribution of response from the patient is not input to, used by, or generated within the process for generating the value. The value is generated without using imaging or reconstruction. For example, the machine-learned model used to generate the analytic in act 216 does not receive a reconstruction as input, does not perform reconstruction, and does not have reconstruction within.

In act 214, the processor generates the value in response to input of information of the scan configuration and the raw data. Both the acquired measurements and a descriptor of how the measurements were acquired are used to generate the value. The descriptor represents one or more aspects of the configuration of the MR scanner in scanning during act 200. For example, the type of scanner and/or settings of controls for the scanner (e.g., settings for a selected protocol) are used as the descriptor.

Any level of abstraction of the configuration may be used. In one embodiment, the specific controls are used. The information input for generating the values are one or more scanner controls, such as k-space coordinates, repetition time, time-to-echo, and/or flip angle. The value is generated in response to input of the k-space coordinates, repetition time, time-to-echo, and flip angle to the machine-learned model. This relatively high-level of abstraction of the control may be most appropriate where image-caliber MR scanners are used (e.g., by MR scanners providing homogeneous B0 and B1 fields and non-linear gradients).

For MR scanners with less homogenous and/or less linear capabilities, the information input may have a lower level of abstraction. For example, the information from the configuration is the pulse envelopes, carrier frequencies, timings, and durations of the pulses used in the MR scan of act 200. The value is generated in response to input of the pulse envelopes, carrier frequencies, timings, and/or durations to the machine-learned model. These descriptors are mid-level parametric descriptions of the MR electrical controls.

In alternative embodiment, the information from the configuration is the raw transmit pulses themselves or a representation of the transmit pulses. The value is generated in response to input of the transmit pulses to the machine-learned model. The transmit pulses themselves may be a large amount of data. To reduce the data, a latent space representation of the transmit pulses is used. An encoder, as part of an encoder-decoder generator trained to form the input to the encoder as an output of the decoder, is trained to generate the transmit pulses based on input of the transmit pulses. The encoder learns to form more abstract features at a bottleneck with the decoder. If using the raw pulses, the raw pulses may first be passed through a deep encoder to reduce the data size and learn the latent manifold of the used pulses. Once trained, the encoder may be used to determine values for the features, these values of the features are the latent space representation. The encoder outputs the latent space representation or fingerprint for the transmit pulses in response to input to the encoder of the transmit pulses. The value of the analytic is generated in response to input of the latent space representation of the transmit pulses to the machine-learned model.

Figure 3:
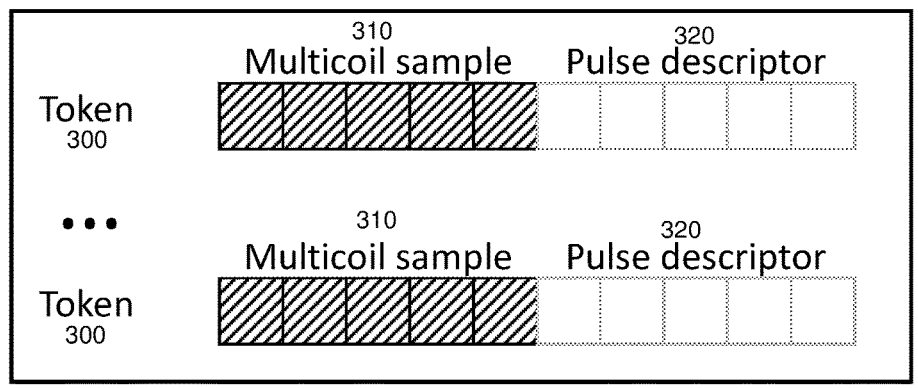
FIG. 3 illustrates example tokenization for input to a machine-learned model for generating a value of an analytic from raw MR data.

The input may have any of various formats. For example, separate inputs are provided for each control variable and for the raw data. In one embodiment, a plurality of tokens is defined for use as the input. FIG. 3 shows one example of the tokens 300. Each of the tokens 300 is the raw data for all or a sub-set of the receive coils from one of the transmit pulses (multicoil sample 310) and the information (pulse descriptor 320). The different tokens 300 are for the different ones of the transmit pulses of the pulse sequence. The descriptor 320 may have the same or different information about the configuration, such as having some or all of the descriptor 320 being different, for different pulses in a same sequence. Since MR measurements within a scan are typically all acquired with different scanner configurations (except in the case of signal averaging), each individual sample 310 comes with its own descriptor 320. If the device contains multiple receive coils, then each measurement sample 310 includes the one descriptor 320 and the vector of data acquired by each coil in the sample 310. Other token formats may be used.

The raw data in the sample 310 is the measurements. Other processing may be performed on the measurements before input or forming the tokens 300. For example, filtering or cropping (e.g., frequency selection) is performed prior to input.

The tokens 300 are input to the machine-learned model. The machine-learned model was previously machine trained to receive the tokens or other defined inputs (e.g., raw data and information from the configuration) and output the value for the analytic in response to the input. Due to the training, including the training data and ground truths used in training, specific values of learnable parameters of the machine-learned model were learned. Different training processes, training data, ground truths, and/or architecture of the model may result in different values of the learnable parameters and different values being output in some situations. How the model was trained affects the application of the model for a particular patient.

The machine-learned model has any of various architectures. For example, the machine-learned model is a neural network, such as a fully connected neural network (FCN) or a convolutional neural network (CNN). Any architecture or layer structure for machine learning may be used. The architecture defines the structure, learnable parameters, and relationships between parameters. In one embodiment, a convolutional or another neural network is used. Any number of layers and nodes within layers may be used. A DenseNet, encoder, autoencoder, CNN, FCN and/or another network may be used. Some of the network may include dense blocks (i.e., multiple layers in sequence outputting to the next layer as well as the final layer in the dense block). Any know known or later developed neural network may be used. Any number of hidden layers may be provided between the input layer and output layer.

Figure 4:
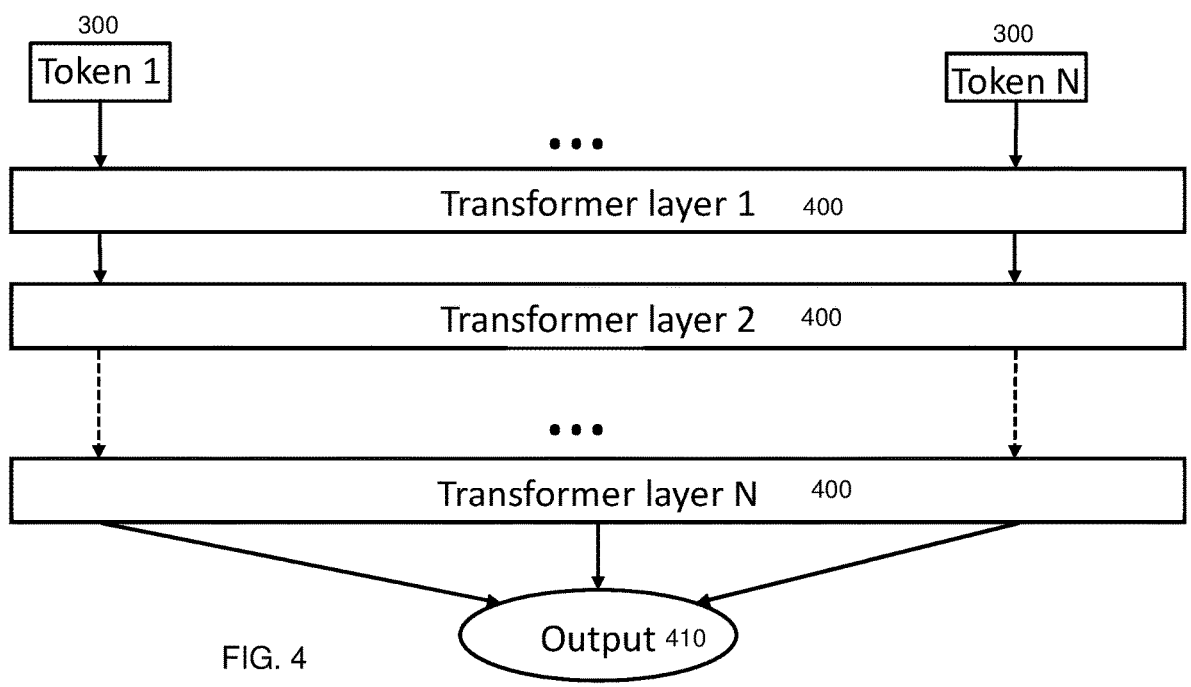
FIG. 4 illustrates an example machine-learned model for generating a value of an analytic from raw MR data.

FIG. 4 shows another example architecture. A neural network of transformer layers 400 form the architecture. The first of the transformer layers 400 receives as input the tokens 300 from an entire scan or as available during the scan. The transformer layers 400 include attention layers. Each transformer layer 400 includes one or more attention layers. The different transformer layers 400 may have the same or different structure. In one embodiment, the transformer layers 400 have stacked self-attention and point-wise fully connected (position-wise fully connected feed-forward) layers for an encoder and decoder. Other structure or neural network layers may be included in a transformer layer 400, such as a normalization, masked multi-head attention, linear, and/or softmax layers. Other transformer layers or networks may be used. Any number, such as 2-10, of transformer layers 400 may be used. The output 410 is a neural network layer, such as a fully connected layer, softmax layer, and/or pooling layer, that combines the tokens 300 from the last transformer layer 400 into the value for the analytic.

The information from the configuration is used as position encoding within the sequence of the transformer layers 400. Transformers handle irregularly sampled data. In a transformer, data are passed as a set of multidimensional tokens 300 and the network is a succession of attention layers that update the tokens 300 with a weighting of the most similar other tokens 300, and token-wise fully connected layers change the individual encoding of each token 300. In other applications, the token representations are usually enriched with a position encoding so that the similarity computed in the attention layer takes both content similarity and topological proximity into account. For generating a value of an analytic from k-space data in a medical scan, the pulse descriptor plays the role of a position encoding. This position encoding may be abstracted or may be actual k-space coordinates if the underlying hardware is able to sample in k-space.

The model, as defined by the architecture, is trained. While transformers constitute the established state of the art in natural language processing, transformers typically require extremely large amounts of data to train and require a self-supervised pre-training step to be exposed to more data than can be annotated. Pre-training is performed by training the network to restore the original data (ground truth) from synthetically distorted inputs (input samples). The pre-training uses the model as an encoder in a generative or encoder-decoder arrangement. Embodiments for distorting the inputs include masked modeling, where distorting the inputs randomly removes measurement data from some of the tokens 300, and denoising auto-encoding, where distorting the inputs adds random noise. For MR analytic generation, the model may be pre-trained in this self-supervised manner. Multiple different sources of distortion can be applied during pre-training. Pre-training can be performed on currently available raw data, typically collected for MR reconstruction projects.

In one embodiment, pre-training is performed with self-supervision at one or more scanners, such as tens or hundreds of scanners. For example, the model is pretrained by continual distributed learning in different scanners. The self-supervised pre-training is performed by continual distributed learning embedded in existing scanners in clinical use (i.e., the system learns from each new scan being performed for one or more scanners). During pre-training, the data selection is not restricted by body region, hardware or protocol inclusion criteria, which increases the amount of usable data. Pre-training data can be enriched with synthetic data obtained by physical simulation. The pre-trained models from the different scanners are then combined for further training. Alternatively, each scanner pre-trains their own model that is then trained for that scanner.

The amount of training data may be increased in other ways. For example, the training uses synthetic data. Physical simulations based on a database of clinical MR images are used to create additional training data. MR parametric maps (T1, T2, PD, ADC, . . . ) are generated from the clinical images. The images may first be segmented into tissue types, then the parameter values for each are filled by a table of parameter value ranges for each tissue. Acceptable values within those ranges are randomly chosen for each tissue of each image. Multiple maps with different parameter values can be generated for each image for data augmentation. Smooth parameter variations can be allowed within each connected component of each tissue. The parametric maps, hardware specifications, and the description of the pulse sequence are then passed to a physical simulator using a physical model of magnetic resonance such as the Bloch equations to compute synthetic data that would be generated by performing the test described by the pulse sequence on a subject described by the parametric maps using a device described by the hardware specification. Since pulse description parameters are passed to the model as information for the configuration, the model is able to process data acquired using a plurality of protocols. Such a plurality can be generated during simulation by applying multiple pulse sequences to each subject. The synthetic data is used for training or pre-training with or without actual data from patients.

After pre-training, supervised training is performed by passing annotated raw data to the network and training the model to output the label. Annotated raw data can be synthesized from an annotated clinical image dataset. The raw data are synthesized as previously described, and the labels are obtained from the images, either by human readers or by a pre-existing image-based AI analytics system. The labels can be a spatial map of localized findings or global classes assigned to the whole image. The system output (ground truth values of the analytic) can be a binary answer denoting the presence or absence of a finding or a continuous finding likelihood score. During supervised training, the network can be trained to perform a given task (i.e., output one set of labels) from a plurality of input pulse sequences.

The machine training uses a loss to learn the values of the learnable parameters. The training uses a loss function based on a difference between a predicted value and the ground truth value. The loss function, such as a cross-entropy loss, is computed for optimizing the values of the learnable parameters for the network. Any optimization may be used, such as Adam.

Machine learning is an offline training phase where the goal is to identify an optimal set of values of learnable parameters of the model that can be applied to many different inputs. These machine-learned parameters can subsequently be used during clinical operation to generate the label (i.e., value of the analytic). Once trained, the machine-learned model is used in act 216 in an online processing or testing phase in which scan data and information about the scan are input to generate the value of the analytic.

At test time, an MR scanner performs the data acquisition using one of the pulse sequences for which the machine-learned model was trained. The acquired data are then processed by the machine-learned model in act 216 of FIG. 2 to obtain the finding score (value). That score is then output as the test result to be used in the clinical workflow. It may be the only output (i.e., no reconstructed image). In addition, the acquired data can be exported for long-term storage to ensure compliance with local policies and regulations or to support data collection efforts.

In some embodiments, all the acquired scan data are processed after the scan session completes. In other embodiments, the data are continuously processed by the machine-learned model as they are acquired. This can be useful for patient monitoring (e.g., motion detection) or for active scanning, if the scanner needs to change configuration based on the data already received.

In act 220, a display (display screen or device) displays the value for the analytic. The value of the parameter representing the patient, such as the value of the clinical finding, is displayed. The display may be as part of a report for the patient, a pop-up, as a laboratory result, or as part of an electronic health record for the patient. The value is displayed as alphanumeric text, a graphic, or in a graph or chart. The value may be displayed without an image of the anatomy of the patient. In other embodiments, the value is displayed with an image of the anatomy of the patient, such as an image acquired with a non-MR modality (e.g., x-ray) or an image reconstructed from the MR scan.

The display presents the value for viewing by the user, radiologist, physician, clinician, and/or patient. The value assists in diagnosis.

Although the subject matter has been described in terms of exemplary embodiments, it is not limited thereto. Rather, the appended claims should be construed broadly, to include other variants and embodiments, which can be made by those skilled in the art.

What is claimed is:

1. A method of data analytics for magnetic resonance (MR) scanning, the method comprising:
    scanning, by a MR scanner, a patient using a first configuration of the MR scanner, the scanning resulting in raw data;
    generating, by a machine-learned model, a value for an analytic of the patient in response to input of information of the first configuration and the raw data to the machine-learned model, wherein the machine-learned model comprises a neural network of transformer layers, a first of the transformer layers receiving tokens as input, each of the tokens being measurements from different pulses of the scanning by the MR scanner as the raw data and each of the tokens including the information as a descriptor of the first configuration of the MR scanner, the value generated without image reconstruction; and
    displaying, by a display, the value for the analytic.

2. The method of claim 1 wherein scanning further comprises scanning with a non-uniform main magnetic field, non-homogeneous first pulses, and non-linear gradients.

3. The method of claim 1 wherein the information of the first configuration comprises first pulses, and wherein generating further comprises generating in response to input of the first pulses to the machine-learned model.

4. The method of claim 1 wherein the information of the first configuration comprises scanner controls comprising k-space coordinates, repetition time, time-to-echo, and flip angle, and wherein generating further comprises generating in response to input of the k-space coordinates, the repetition time, the time-to-echo, and the flip angle to the machine-learned model.

5. The method of claim 1 wherein the machine-learned model further comprises a sequence of transformers comprising attention layers, wherein the information is used as position encoding within the sequence.

6. The method of claim 1 wherein the machine-learned model is pretrained with self-supervision at a plurality of other scanners.

7. The method of claim 1 wherein generating further comprises generating the value for cancer or not as the analytic.

8. The method of claim 1 wherein generating further comprises generating the value for no further scanning or further scanning as the analytic.

9. The method of claim 1 wherein generating further comprises generating without MR image reconstruction as an input to the machine-learned model and without performance of the MR image reconstruction by or within the machine-learned model.

10. A method of data analytics for magnetic resonance (MR) scanning, the method comprising:
    scanning a patient using a first configuration of an MR scanner, the scanning resulting in raw data;
    generating a value for a parameter as a global characterization of the patient in response to input of information of the first configuration and the raw data to a machine-learned model, wherein the machine-learned model was pre-trained with self-supervision at a plurality of other scanners; and
    displaying the value for the parameter.

11. The method of claim 10 wherein generating further comprises generating without MR image reconstruction from the raw data.

12. The method of claim 10 wherein the machine-learned model comprises a neural network of transformer layers, a first of the transformer layers receiving tokens as input, each of the tokens being measurements from different pulses of the MR scanning as the raw data and each of the tokens including the information as a descriptor of settings of the MR scanner.

13. A system for magnetic resonance (MR) scanning, the system comprising:
    a MR scanner configured by settings of controls to scan a region of a patient, the scan providing raw data;
    a processor configured to determine a global analytic for the patient by application of a machine-learned network to the raw data without reconstruction from the raw data, wherein the machine-learned network comprises a neural network of a sequence of attention layers where an input of the neural network receives tokens, each token being the raw data from one or more coils in combination with information about the settings of the controls for a transmit pulse; and
    a display configured to output the global analytic.

* * * * *